(No Model.)

J. T. BARKER.
FURNACE FOR DENTAL USE.

No. 577,638. Patented Feb. 23, 1897.

Witnesses:
Chas. B. Shumway
J. E. Chapman

Inventor
J. T. Barker
By Wm. T. Chapman
Attorney.

UNITED STATES PATENT OFFICE.

JOHN TENNEY BARKER, OF WALLINGFORD, CONNECTICUT.

FURNACE FOR DENTAL USE.

SPECIFICATION forming part of Letters Patent No. 577,638, dated February 23, 1897.

Application filed June 1, 1896. Serial No. 593,737. (No model.)

*To all whom it may concern:*

Be it known that I, JOHN TENNEY BARKER, a citizen of the United States, residing at Wallingford, in the county of New Haven and State of Connecticut, have invented a new and useful Improvement in Furnaces for Dental Use, of which the following is a specification, reference being had to the accompanying drawings, forming part thereof.

My invention relates to apparatus used by dentists for the various soldering operations involved in the practice of dentistry and for smelting gold and other metals; and it has for its object to provide an apparatus of this nature which can be conveniently used and by means of which gas under a high degree of air-pressure can be forced upwardly through the bed of asbestos or other similar material upon which the "case" or work to be operated upon is laid, or through the ordinary blowpipe, or through both simultaneously at will.

To this end my invention consists in the apparatus hereinafter fully described, and particularly pointed out in the claims.

Figure 1:
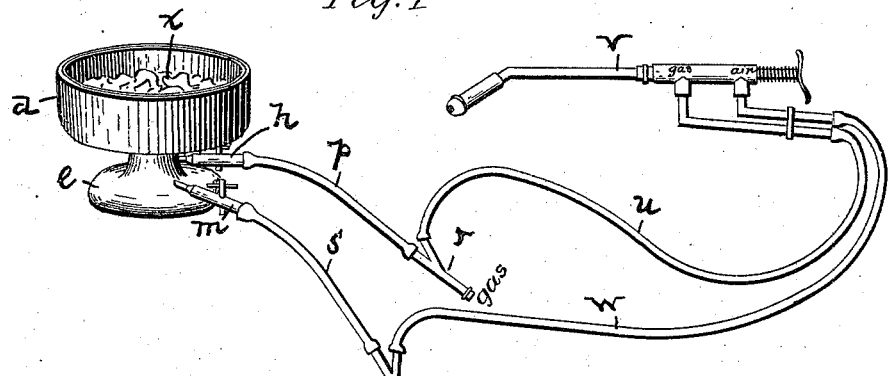
Figure 2:
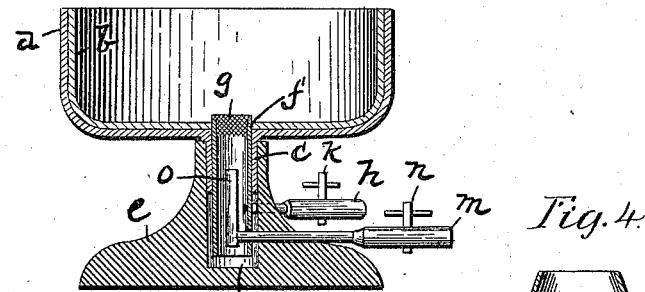
Figure 3:
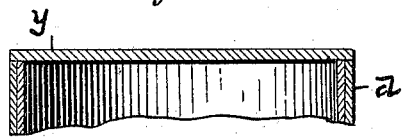
Figure 4:
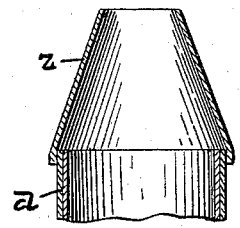

Referring to the drawings, in which like letters designate like parts in the several views, Figure 1 is a view in perspective of an apparatus embodying the invention connected with a blowpipe of common form. Fig. 2 is a central vertical section of the soldering-cup and its base. Fig. 3 is a detail sectional view of the top of the cup when supplied with a cover of asbestos. Fig. 4 is a similar view thereof when supplied with a hood for smelting purposes.

The letter $a$ designates the soldering-cup, which is preferably provided with a lining $b$ of asbestos or similar material, as shown in Fig. 2, and has a centrally-disposed opening in its bottom, which opening is surrounded by the downwardly-projecting tubular stem $c$. Said stem $c$ fits loosely within the centrally-disposed socket $d$ of the base $e$, whereby the cup is adapted for a free revolving movement upon said base. A tube $f$, suitably seated in the socket in said base, passes upwardly through the stem $c$ to the bottom of the cup and has its upper end covered with a screen $g$, of wire-gauze or other suitable material. A short pipe-section $h$ passes laterally through the base into said tube $f$, in which pipe-section is located the cock $k$, and a similar pipe-section $m$, containing the cock $n$, passes through the base and said tube $f$ into a smaller and shorter tube $o$, centrally located within said tube $f$. A short piece of tubing $p$ connects the pipe-section $h$ with one of the branches of a Y-coupling $r$, and a piece of tubing $s$ connects the pipe-section $m$ with one branch of a similar coupling $t$. The opposite branch of the coupling $r$ is connected by a tube $u$ with the gas-inlet of a blowpipe $v$, while the opposite branch of the coupling $t$ is connected by a tube $w$ with the air-inlet of said blowpipe, as shown in Fig. 1. The said blowpipe $v$, which is of well-known form and in general use, is provided with interior valves for opening and closing said gas and air inlet openings, which are operated by gripping the instrument in one hand and compressing its two members together in opposition to its spring, as will be clearly understood by persons skilled in the art without further description or illustration, it being herein shown as one example merely of the various forms of manually-operated blowpipes now in use, to all of which my invention is equally applicable. The main stem of the coupling $r$ is connected by suitable pipe or tubing with the gas-burner, and the main stem of coupling $t$ is similarly connected with the foot-bellows or other source of air-pressure.

The cup $a$ contains the usual bed $x$ of asbestos, pumice, or other suitable material for holding the work, the particles composing which bed are prevented from entering the tube $f$ by the screen $g$.

It will be obvious from an inspection of Fig. 1 that, with the main stems of the Y-couplings $r$ and $t$ connected, respectively, with the sources of gas and air supply, as described, by opening the cocks $k$ and $n$ and leaving the blowpipe-valves shut the gas and accompanying blast of air will pass upwardly through the bed $x$ in the cup $a$ to the work, and that by closing said cocks $k$ and $n$ and opening the valves in the blowpipe the entire supply of gas and air will be diverted through the latter, as in the ordinary use of said blowpipe. It will be equally obvious that by leaving the cocks $k$ and $n$ open and also opening the valves in the blowpipe an air-blast of flame will be induced both upwardly through the cup and through the blowpipe simultaneously, and that by opening cock $k$ simply and leaving cock $n$ closed a gas-flame without any air-blast will pass upwardly through the cup, while the blast induced by the blowpipe can be utilized in the ordinary manner. It will thus be seen that the apparatus devised by me can be used for a great variety of soldering operations incident to the practice of dentistry, the manner of the application of heat to the work being under instant control. The apparatus thus not only expedites said soldering operations materially, but also enables better and more accurate work to be done than has heretofore been practicable.

For simply soldering two pieces of gold together, as in some of the operations of "crown-work," I prefer to place a circular cover $y$ (see Fig. 3) upon the cup $a$ to support the work, the air-blast secured by the blowpipe alone being usually sufficient for such operation.

In Fig. 4 I have represented the cup $a$ as being surmounted by a conical hood $z$, having an opening at the upper end thereof, and when so arranged the apparatus is adapted for use as a smelting-furnace for melting gold, &c., by placing the material to be melted within a crucible and depositing the latter within the cup beneath said hood.

The apparatus herein described is simple and comparatively inexpensive in construction, yet strong and durable, and by its use, as before stated, many of the finer mechanical operations incident to the practice of dentistry are greatly facilitated.

The capacity of the cup $a$ for free revolution upon its base enables all parts of the work to be readily brought to the most convenient position for soldering.

I do not wish to limit myself to the use of the apparatus devised by me in connection with the particular form of blowpipe herein illustrated, as it is equally well adapted for use with any of the various forms of mechanical blowpipes in use.

Having thus fully described my invention, what I claim, and desire to secure by Letters Patent, is—

1. The combination with the base $e$ provided with the socket $d$, of the cup $a$ having the tubular stem $c$ projecting within said socket, tube $f$ projecting upwardly within said stem $c$ and having at its upper end the screen $g$, tube $o$ projecting upwardly within said tube $f$, and pipe-sections $h$ and $m$ communicating with said tubes respectively, substantially as set forth.

2. The combination with base $e$, of cup $a$ revolubly mounted upon said base and having a lining of asbestos as described, and means for admitting both gas and compressed air to said cup through said base, substantially as described.

3. The combination with base $e$, cup $a$ revolubly mounted upon said base, tube $f$ secured upon said base and communicating with said cup, tube $o$ located within said tube $f$ and also communicating with said cup, and pipe-sections $h$ and $m$ communicating with said tubes respectively, of the Y-couplings $r$ and $t$, tubes $p$ and $s$ connecting one branch of each of said couplings with said pipe-sections $h$ and $m$ respectively, and means for connecting the opposite branch of each of said couplings with the gas and air inlets respectively of a hand-blowpipe and for connecting the main stems of said couplings with a source of gas-supply and a source of compressed-air supply respectively, arranged and operating substantially as described.

JOHN TENNEY BARKER.

Witnesses:
WM. N. CHAPMAN,
DENISON B. TUCKER.